United States Patent
Wickizer et al.

[11] Patent Number: 6,098,333
[45] Date of Patent: Aug. 8, 2000

[54] LEVERAGE FEATURE FOR A FISHING ROD HANDLE

[76] Inventors: Kirk C. Wickizer, 16732 Zachary Dr., Macomb, Mich. 48042; Jeffrey P. Wickizer, 910 Northern Dancer Way, Casselberry, Fla. 32707

[21] Appl. No.: 08/800,230

[22] Filed: Feb. 12, 1997

[51] Int. Cl.[7] .................................................. A01K 87/00
[52] U.S. Cl. ................................................................. 43/23
[58] Field of Search ............................................ 43/23, 25

[56] References Cited

U.S. PATENT DOCUMENTS

| | | |
|---|---|---|
| 412,479 | 10/1889 | Davis . |
| 2,091,458 | 8/1937 | Sleight . |
| 2,116,158 | 5/1938 | Pontis . |
| 4,043,071 | 8/1977 | Lando . |
| 4,130,960 | 12/1978 | Fontenot . |
| 4,209,931 | 7/1980 | Vance . |
| 4,644,680 | 2/1987 | Dawson . |
| 4,649,661 | 3/1987 | Myojo . |
| 4,653,215 | 3/1987 | Strader ........................................ 43/23 |
| 4,793,087 | 12/1988 | McGee ........................................ 43/23 |
| 4,848,022 | 7/1989 | Ozeki et al. . |
| 4,850,130 | 7/1989 | Childre ........................................ 43/23 |
| 4,858,365 | 8/1989 | Struntz ........................................ 43/23 |
| 4,905,400 | 3/1990 | Brackett ........................................ 43/23 |
| 4,962,608 | 10/1990 | Loomis et al. . |
| 5,189,824 | 3/1993 | Yamato . |
| 5,291,684 | 3/1994 | Oyama ........................................ 43/23 |
| 5,313,735 | 5/1994 | Latouche ........................................ 43/23 |
| 5,363,585 | 11/1994 | Ohmura . |
| 5,396,727 | 3/1995 | Furuya ........................................ 43/23 |
| 5,509,228 | 4/1996 | Wright ........................................ 43/23 |

*Primary Examiner*—Kurt Rowan
*Attorney, Agent, or Firm*—John R Benefiel

[57] ABSTRACT

A leverage feature is provided for a fishing rod extending laterally from the fishing rod handle a short distance to the rear of a reel. The leverage feature has a contoured cupped ridge shape which is inclined to the rear so as to be engaged by the side of the hand when the rod handle is palm gripped during play of a hooked fish to greatly improve the leverage able to be exerted by the hand in resisting the tipping of the rod by the pull of the fish. The leverage feature relative the reel can be adjusted to be fit to the particular size of the user's hand.

10 Claims, 6 Drawing Sheets

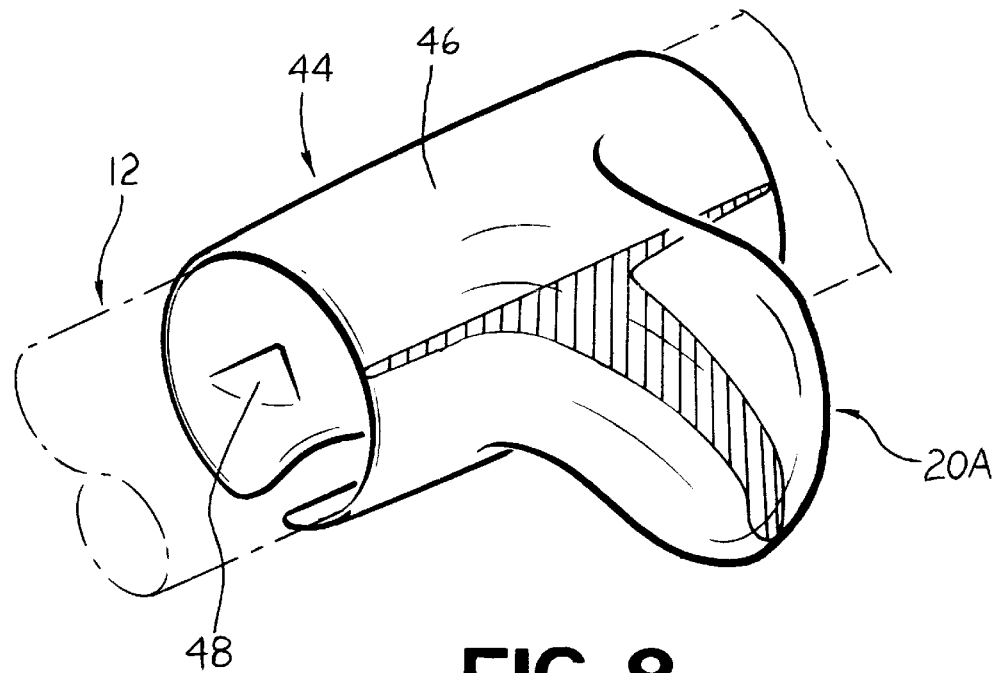
FIG 8
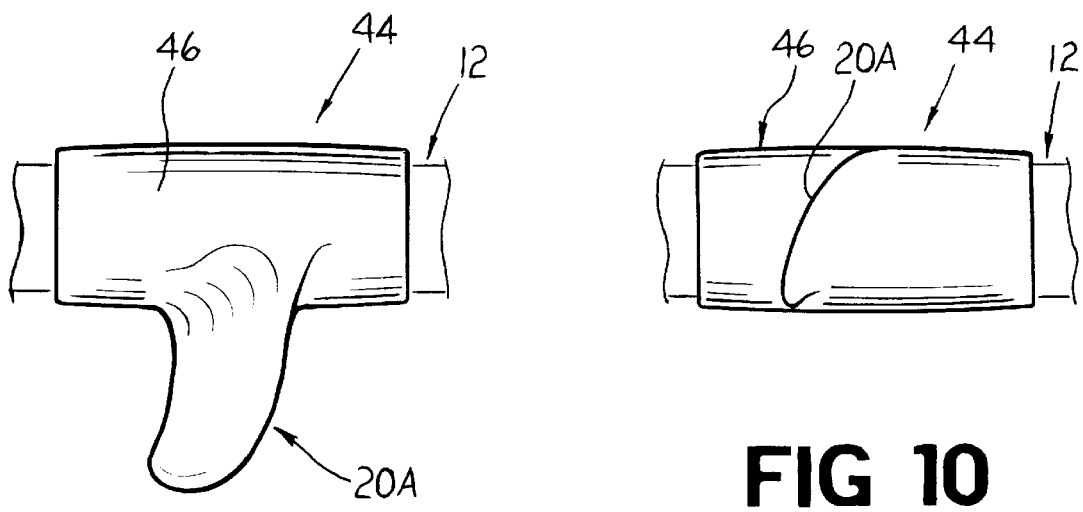
FIG 9
FIG 10

LEVERAGE FEATURE FOR A FISHING ROD HANDLE

BACKGROUND OF THE INVENTION

This invention concerns handles for fishing rods. The handle of a fishing rod is gripped during casting and retrieval of lures, and also during playing of a hooked fish. Considerable effort is required in playing a larger fish since the angler must operate the reel with one hand to wind in excess line, leaving only one hand to grip the rod handle. Considerable turning moments can be exerted on the rod handle by the tug of a bass or other strong game fish on the rod tip due to the leverage created by the length of the rod, creating a strong downward directed torque at the handle.

Fisherman have taken to resting the thumb on the top of the reel for greater comfort and to enable greater leverage to be exerted by the gripping hand in resisting the pull of the fish. This grip is referred to as "palming" or as the "palm grip". Nonetheless considerable effort is still required during playing of the fish, which effort can cause tiring of the hand.

Improved handle grips have long been proposed which seek to reduce the hand fatigue involved. None of these improved grips have been entirely successful and some render the handle more difficult to use, particularly when shifting from one or two-handed casting to retrieving the line and playing a hooked fish.

It is the object of the present invention to provide a grip feature for a fishing rod handle which allows a user gripping the handle to better resist downward pulling forces exerted by the line tugging at the rod tip, to greatly reduce the effort required, when the hand is positioned in the palm grip position with the thumb hooked over the top of the reel.

It is a further object to provide such feature which does not impede gripping the rod for casting or retrieving, and which generally does not make handling of the fishing rod less convenient.

SUMMARY OF THE INVENTION

The above objects are achieved by providing a leverage feature projecting laterally from the side of the handle at a location spaced rearwardly from the reel such as to be firmly engaged by the side of the hand, just below the little finger, when the rod handle and reel are palm gripped with the thumb extended over the top of the reel. The leverage feature is a smoothly contoured ridge sufficiently high to fully accommodate the side of the hand, which ridge slopes upwardly and towards the butt end of the rod handle.

The firm and comfortable engagement of the side of the hand with the leverage feature greatly improves the capacity of the hand to resist pulling at the rod tip when playing a fish, powerfully augmenting the improvement in leverage able to be exerted over that afforded by use of the palm gripping of the rod and reel.

The rod handle can also easily be gripped by the other hand in a more rearward position when casting, as the leverage feature may then be straddled between the little and ring fingers, the rearward inclination of the ridge matching the rearward angle which the fingers naturally assume with the hand in the casting rod grip position.

The leverage feature can be provided in a number of ways, i.e., by being molded or otherwise integrally formed as a part of the handle itself or by being installed as a separate piece.

The leverage feature may be adjustably positioned relative the reel by mounting the reel to be located in forward or rearward shifted positions to provide some degree of accommodation for differing handle sizes. This adjustment can be effected by threaded pieces cooperating with the reel mounting.

Alternatively, a separate piece having a sleeve portion may be formed with the leverage feature. The sleeve portion is slidably received over the handle in any desired position. The sleeve portion is then anchored in position as with an internal barb which prevents backward sliding from an adjusted position or counterclockwise rotation under pressure exerted by the side of the hand.

BRIEF DESCRIPTION OF THE DRAWINGS

FIG. 8 is a perspective view of another embodiment of the separate adjustable piece formed with the leverage feature, with adjacent fragmentary rod portions shown in phantom and with a portion of the separate piece partially broken away in section.

FIG. 9 is a top view of the piece shown in FIG. 8.

FIG. 10 is a side view of the piece shown in FIGS. 8 and 9.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
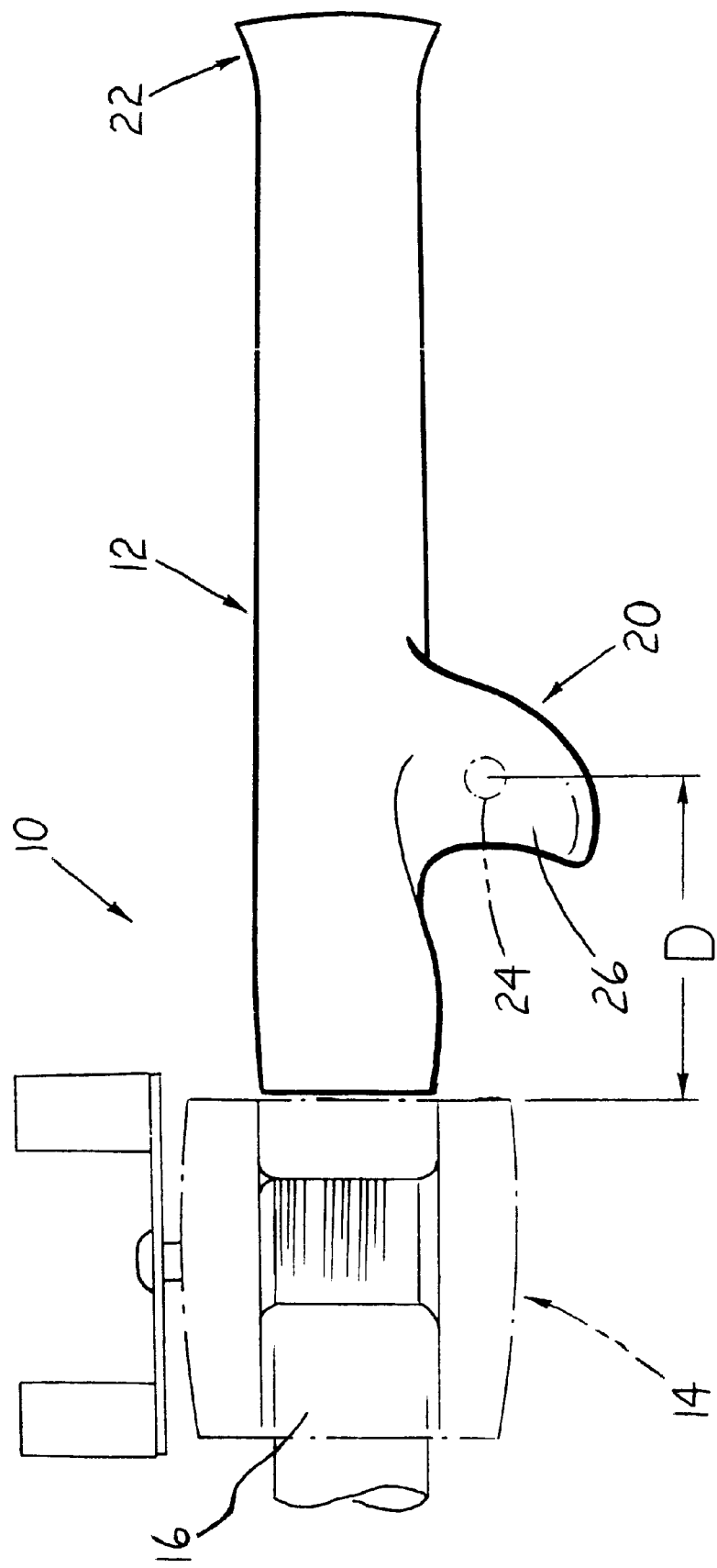
FIG. 1 is a top fragmentary view of a fishing rod having a handle equipped with a leverage feature according to the present invention, also showing in phantom the reel and adjacent reel mounting portions of the rod.
Figure 2:
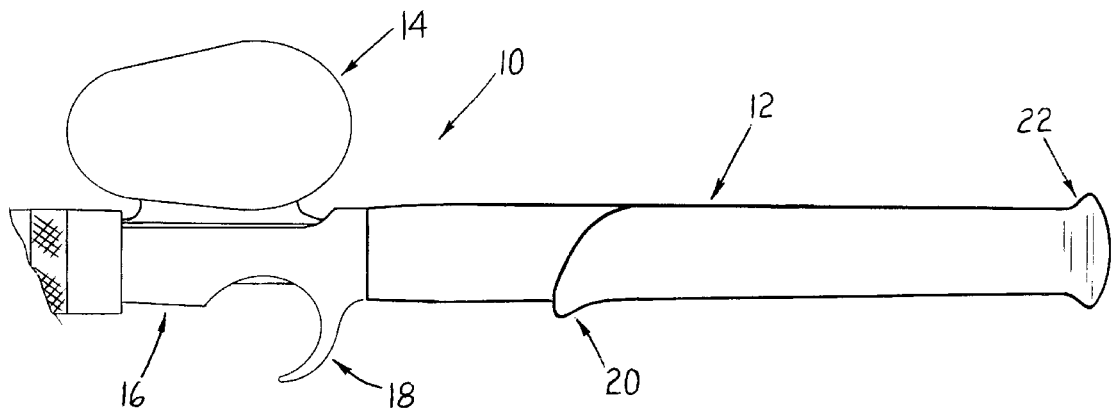
FIG. 2 is a side elevational view of the fishing rod handle, reel, and adjacent mounting portions of the rod shown in FIG. 1.

Referring to the drawings, FIGS. 1 and 2 illustrate the handle end portion of a fishing rod 10. The rod 10 has a handle 12 located below a casting reel 14 mounted atop a section 16 of the rod 10 just forward of the handle 12, all in the conventional manner. A conventional finger hook 18 is also shown which allows a more secure hold on the rod when casting, in the well known manner.

According to the concept of the present invention, a leverage feature 20 projects laterally from the side of the handle 12, the feature located a short distance D to the rear of the reel mounting section 16 of the rod 10.

The leverage feature 20 comprises a smoothly contoured ridge which is inclined to slope steeply upwardly and rearwardly towards the butt end 22 of the handle 12, away from the tip end of the rod 10. The ridge is sufficiently high, i.e., projects laterally a sufficient distance to comfortably accommodate the side of a person's hand, i.e., projecting laterally approximately 1 to 1½ inches.

Figure 3:
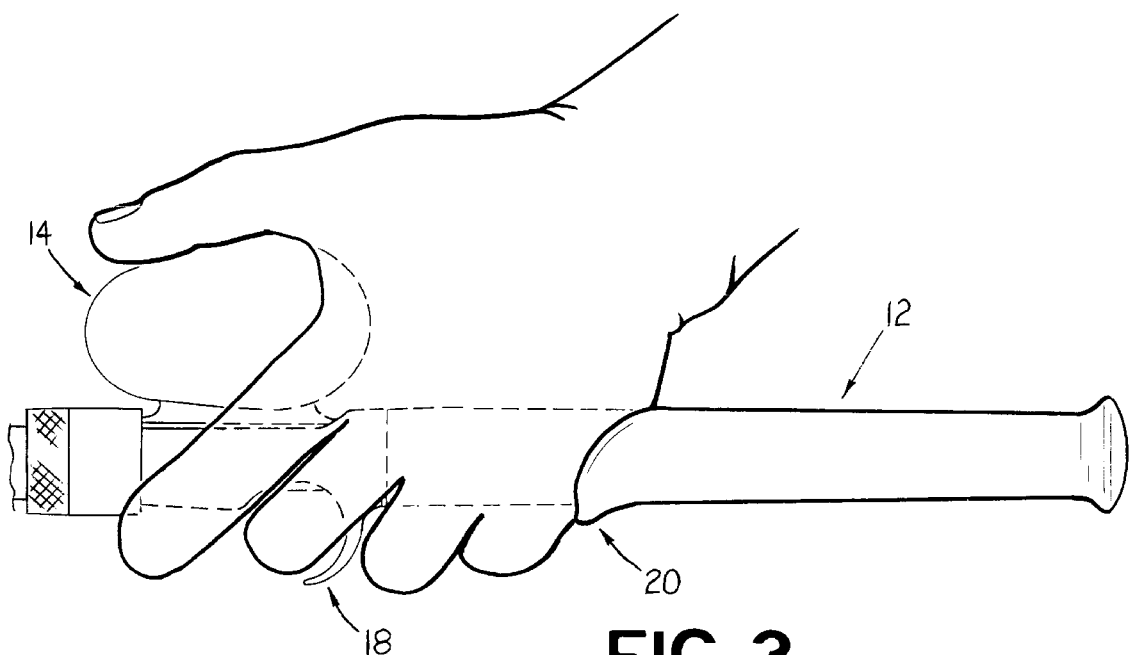
FIG. 3 is a side elevational view of the rod handle and reel of FIGS. 1 and 2 being grasped with the palming grip, illustrating the hand engagement of the leverage feature according to the present invention.
Figure 4:
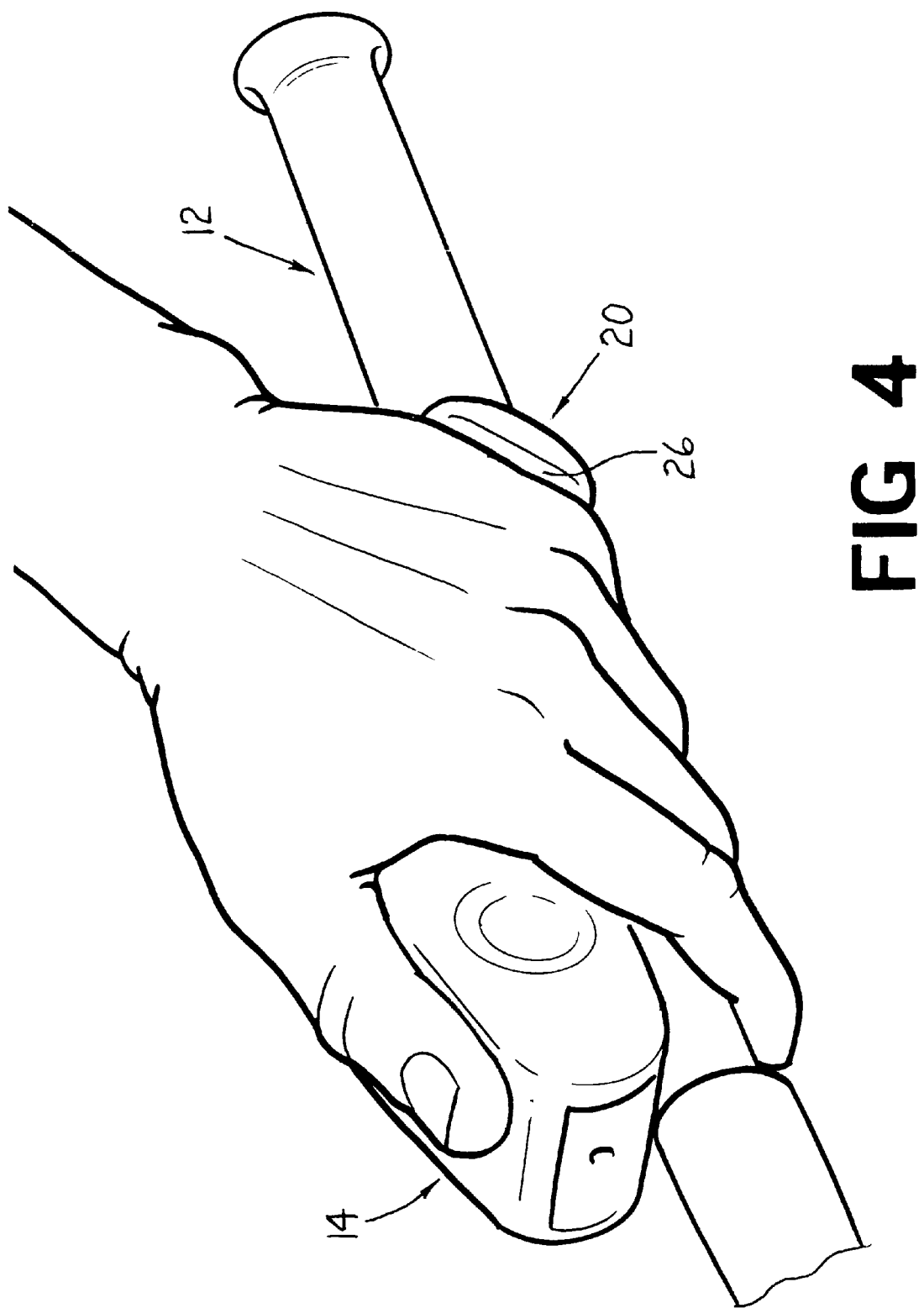
FIG. 4 is a perspective view of the rod handle and reel being grasped in the palming grip of FIG. 3.

The center of the contact 24 on the forward surface 26 of the leverage feature 20 is located spaced to the rear of the reel 14 a distance D, which is predetermined such that the side of the left hand, just below the little finger, is firmly engaged thereby when the rod and reel are grasped with the palming grip, as shown in FIGS. 3 and 4. In the palming grip, the left hand holds the reel and rod with the thumb extended or hooked over the top of the reel 14. This is done for general comfort and to improve the leverage able to be exerted on the rod to resist the downward tipping effect of the tug of the fish acting on the rod tip. The forward surface 26 has a slightly cupped edge shape so as to comfortably receive and securely engage the side of the hand below the little finger, as shown in FIGS. 3 and 4.

The hand, in effect, is thereby coupled to the rod handle, confined between the reel 14 and the front surface 26 of the leverage feature 20. Thus, resistance to downward tipping of the rod causing by the hooked fish pulling on the rod tip is greatly assisted by the presence of the leverage feature 20, substantially reducing the gripping effect which must be exerted to play a hooked fish. Thus, fatigue of the hand as the fish is played is greatly alleviated.

Figure 5:
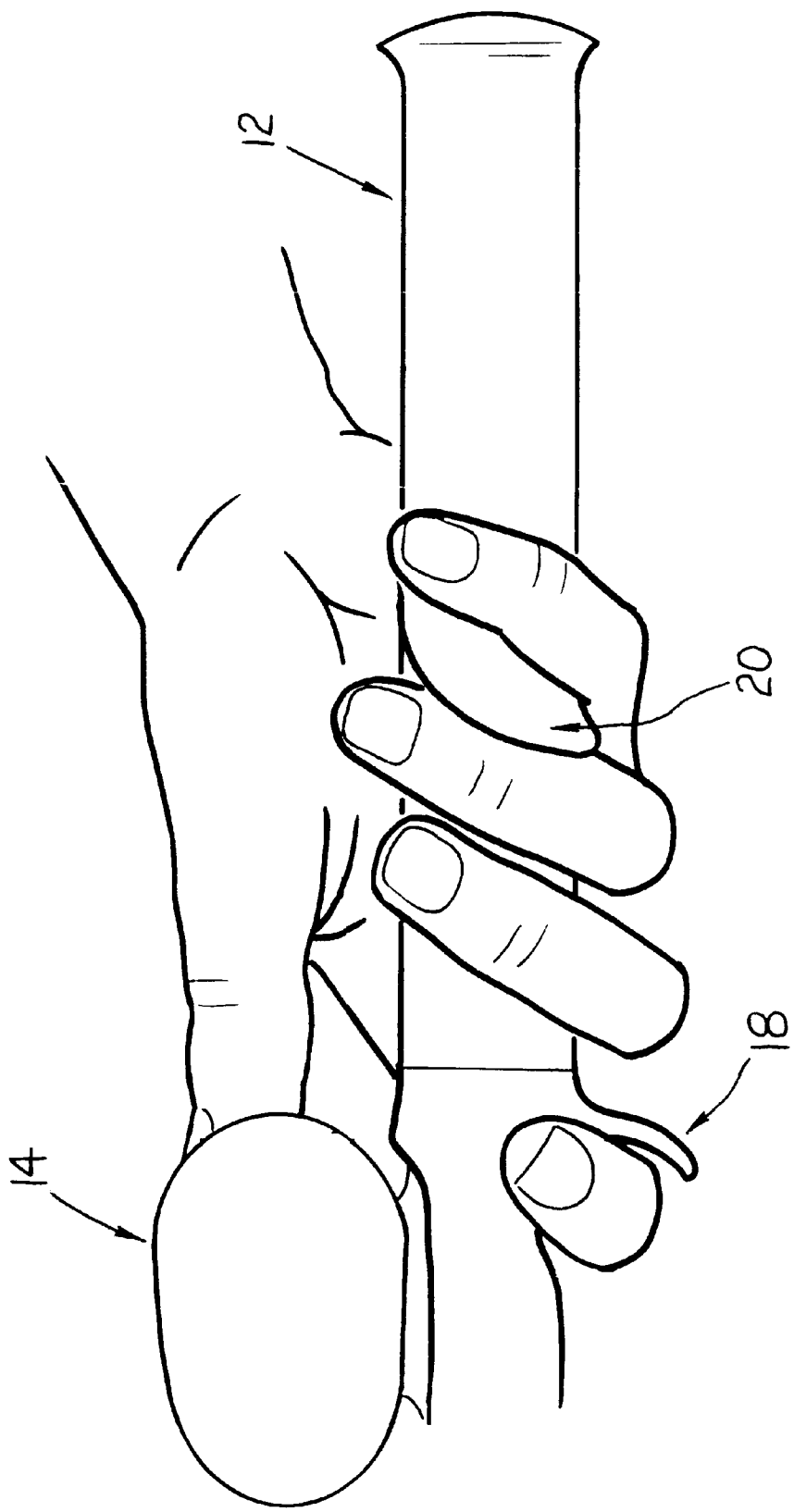
FIG. 5 is a side elevational view of the rod handle, reel, and adjacent rod portions of FIGS. 1 and 2 shown being grasped in the casting position.

FIG. 5 shows that the leverage feature 20 is straddled between the little and ring fingers when the right hand grasps the rod in the casting grip, in which the hand is moved back on the handle 12 to allow the thumb to engage the fishing line windings on the reel.

These fingers naturally tend to assume a position inclined to the rear so as to allow the feature 20, which is also rearwardly inclined, to comfortably nestle between the little and ring fingers as shown.

The feature 20 occupies a relatively small area of the handle 20 so as to not interfere with convenient handling of the rod.

The distance D is selected to provide a comfortable fit, and may range from approximately about 2¼ inches to approximately 3¼ inches or even more for very large hands. Left and right hand versions may also be provided.

The leverage feature 20 may be molded integrally with the handle 12 as shown, with the handle 12 then attached to the rod section 16, or the rod section 16 and handle 12 may be integrally constructed together.

The leverage feature 20 may also be provided on a separate piece assembled to the handle 12 as described below.

Adjustability of the location of the leverage feature relative the reel will allow a custom fit to the hand of an individual user.

Figure 6:
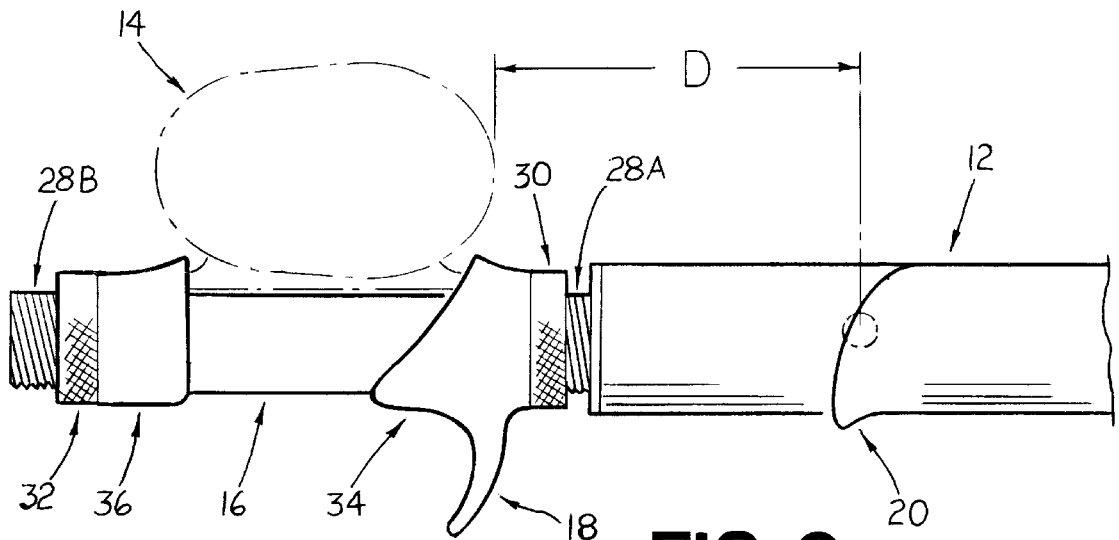
FIG. 6 is a side elevational view of a fishing rod handle, reel, and adjacent rod portions of an alternate embodiment of the invention with the leverage feature formed on the grip, and a separate, adjustably positioned reel seat.

FIG. 6 shows a first arrangement for providing an adjustability to vary the spacing D.

In this embodiment, the rod section 16A has threaded sections 28A, 28B, which threadedly receive tightening rings 30, 32 adapted to be respectively advanced against a rear reel mounting socket 34 and a forward reel mounting socket 36, each in an adjusted position.

The reel 14 can thus be shifted to a more forward or more rearward adjusted position. This in turn varies the distance D as desired.

Figure 7:
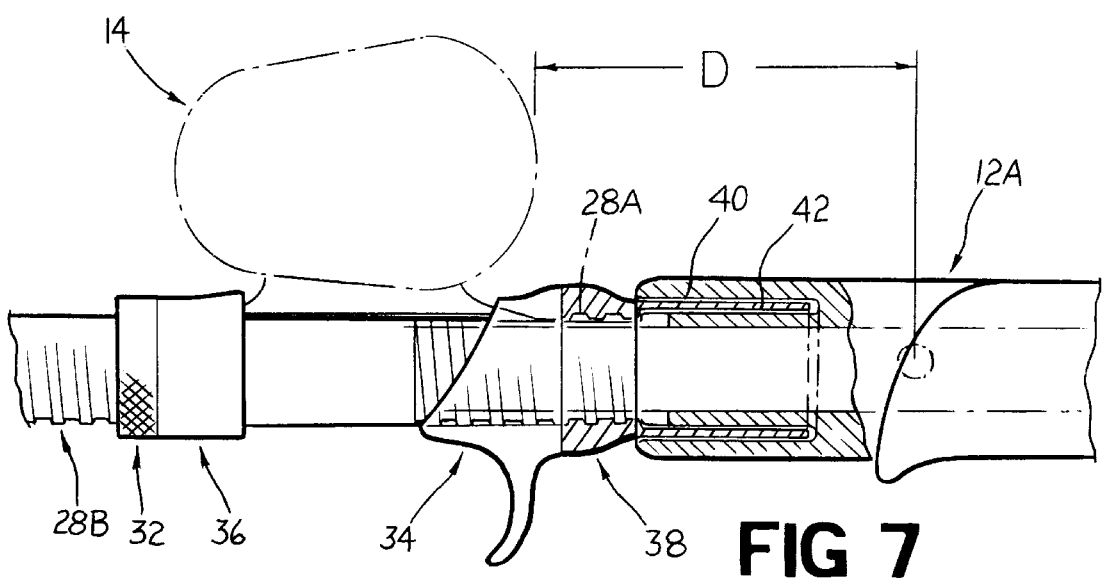
FIG. 7 is a side elevational view of a rod handle, reel, and adjacent rod portions with an alternate form of the embodiment shown in FIG. 6.

FIG. 7 shows a variation which eliminates the gap between the front end of the handle 12 and the rear locking ring 30 of FIG. 6. In this embodiment, a tubular threaded locking piece 38 has a skirt 40 which is received in an annular recess 42 extending axially into the forward end of the handle 12A.

This arrangement allows the reel position to be adjusted while eliminating the gap of the embodiment of FIG. 6.

FIGS. 8–10 show a separate piece 44 comprised of a tubular portion 46 having a ridge feature 20A projecting rom one side. The tubular portion 46 may be split as shown in and is a tight fit with the handle 12. A rear facing barb 48 is molded into the interior of several sections of the tubular portion 46. The tip of the barb penetrates the surface of the handle 12 when the tubular portion 46 is attempted to be slid back or to be rotated counterclockwise (when looking forward).

Thus, the piece 44 can be slid into a desired adjusted position. Engagement of the side of the hand as described above will not cause shifting of piece 44 back as to rotate the feature 20A.

A fisherman using a rod equipped with the leverage feature can play a hooked fish while grasping the rod handle with one hand with greatly reduced effort due to the effect of the leverage feature, such that fatigue is alleviated. Control over the rod tip is also enhanced so that play action is improved. At the same time, the leverage feature does not interfere appreciably with normal handling of the rod during casting.

What is claimed is:

1. In combination with a fishing rod of the type including handle connected at one end to said rod, said rod adapted to mount a reel just forward of said handle on the top of said rod, the improvement comprising:

a leverage feature projecting from one side of said handle and extending from a bottom portion to a top portion of said elongated handle, said leverage feature located a predetermined closely spaced distance to the rear of said reel mounted on said top of said rod so as to be engaged by the side of the hand of a user gripping said rod handle with a palm grip, with the thumb extending atop said reel and with the little, ring, and middle fingers encircling said handle just forward of said leverage feature, whereby improved leverage to resist downward tipping of said rod by the hand of the user is provided by said leverage feature engaging the side of the hand.

2. The combination according to claim 1 wherein said leverage feature comprises an included ridge extending upwardly from said bottom portion of said handle and towards the rear of said rod handle to said top portion of said handle, said ridge projecting laterally a sufficient distance to accommodate the width of the side of a person's hand.

3. The combination according to claim 1 wherein said predetermined distance to the rear is in the approximate range of 2¼ to 3¼ inches from the back of said reel.

4. The combination according to claim 2 wherein said leverage feature has a center of contact at its approximate midpoint.

5. The combination according to claim 4 wherein said predetermined distance as measured to said contact point is in the approximate range of 2¼ to 3¼ inches from the back of said reel.

6. The combination according to claim 2 wherein said ridge has an upwardly facing cupped edge extending along the length thereof from said bottom portion to said top portion of said handle, to tend to retain engagement of the side of the user's hand.

7. The combination according to claim 1 wherein said fishing rod includes mounting means for shifting the mounted location of the reel forwardly or rearwardly in order to adjust the distance to said leverage feature.

8. The combination according to claim 1 wherein said leverage feature is integral with said handle.

9. The combination according to claim 1 wherein said leverage feature is formed on a separate piece attached to said handle.

10. The combination according to claim 9 wherein said separate piece has a sleeve portion from which said leverage feature projects, said sleeve portion installed over said handle.

* * * * *